(12) United States Patent
Naito et al.

(10) Patent No.: US 11,646,436 B2
(45) Date of Patent: May 9, 2023

(54) FUEL CELL SYSTEM

(71) Applicant: HONDA MOTOR CO., LTD., Tokyo (JP)

(72) Inventors: Hideharu Naito, Wako (JP); Takashi Takura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/674,049

(22) Filed: Feb. 17, 2022

(65) Prior Publication Data

US 2022/0271320 A1    Aug. 25, 2022

(30) Foreign Application Priority Data

Feb. 22, 2021  (JP) .............................. JP2021-026009

(51) Int. Cl.
| | |
|---|---|
| *H01M 8/2475* | (2016.01) |
| *H01M 8/04537* | (2016.01) |
| *H01M 8/0247* | (2016.01) |
| *H01M 8/0273* | (2016.01) |

(52) U.S. Cl.
CPC ....... *H01M 8/2475* (2013.01); *H01M 8/0247* (2013.01); *H01M 8/04559* (2013.01); *H01M 8/0273* (2013.01); *H01M 2250/20* (2013.01)

(58) Field of Classification Search
CPC ............ H01M 8/2475; H01M 8/0247; H01M 8/04559; H01M 8/0273; H01M 2250/20; H01M 8/2465
See application file for complete search history.

(56) References Cited

U.S. PATENT DOCUMENTS

| | | | |
|---|---|---|---|
| 10,944,117 B2* | 3/2021 | Imamura | H01M 8/04089 |
| 2005/0170223 A1 | 8/2005 | Okazaki | |
| 2010/0209797 A1* | 8/2010 | Katano | H01M 8/04089 |
| | | | 429/513 |
| 2016/0226084 A1 | 8/2016 | Itoga | |
| 2019/0260059 A1* | 8/2019 | Mizusaki | H01M 8/04089 |
| 2020/0067108 A1 | 2/2020 | Yoshitomi et al. | |
| 2020/0161691 A1 | 5/2020 | Yoshitomi | |

FOREIGN PATENT DOCUMENTS

| | | |
|---|---|---|
| CA | 2 595 091 A1 | 8/2006 |
| JP | 2005-216783 A | 8/2005 |
| JP | 2011-146160 A | 7/2011 |
| JP | 2015-076152 A | 4/2015 |
| JP | 2020-029190 A | 2/2020 |
| JP | 2020-082753 A | 6/2020 |
| WO | 2006/090922 A1 | 8/2006 |

OTHER PUBLICATIONS

Office Action dated Aug. 23, 2022 issued over the corresponding Japanese Patent Application No. 2021-026009 with the English translation thereof.

* cited by examiner

*Primary Examiner* — Stewart A Fraser
(74) *Attorney, Agent, or Firm* — Carrier Shende and Associates, P.C.; Joseph P. Carrier; Fulchand P. Shende

(57) ABSTRACT

A fuel cell system mounted in a vehicle includes a stack case for housing a fuel cell stack. In the stack case, a rear opening is formed in a rear portion facing backward. A cell voltage detection terminal electrically connected to an electrode of the fuel cell stack is exposed in the rear opening. A multilayer filter is provided in the rear opening. The multilayer filter has an inner mesh member, a filter member, and an outer mesh member. An electrical equipment housing case for housing electrical equipment faces the rear opening.

5 Claims, 7 Drawing Sheets

VEHICLE LENGTH DIRECTION
REAR ← → FRONT

FIG. 6

FIG. 7

FUEL CELL SYSTEM

CROSS-REFERENCE TO RELATED APPLICATIONS

This application is based upon and claims the benefit of priority from Japanese Patent Application No. 2021-026009 filed on Feb. 22, 2021, the contents of which are incorporated herein by reference.

BACKGROUND OF THE INVENTION

Field of the Invention

The present invention relates to a fuel cell system that is provided with a stack case for accommodating a fuel cell stack and is mounted in a vehicle.

Description of the Related Art

A fuel cell system includes a fuel cell stack in which a plurality of power generating cells are stacked. When the fuel cell system is mounted in a vehicle, the fuel cell stack is generally housed in a stack case. This point is described, for example, in JP 2015-076152 A, particularly in FIGS. 1 to 4 thereof. As shown in FIG. 1 of JP 2015-076152 A, the stack case is provided with a ventilation cover on a wall surface covering the end portion in the stacking direction of the power generating cells. In a case where hydrogen gas leaks from the fuel cell stack, it is attempted to discharge the hydrogen gas to the outside of the stack case through the ventilation cover.

The fuel cell system includes a voltage control unit (VCU) for controlling the voltage of the fuel cell stack. The VCU is housed in a case. This case is disposed behind the stack case, for example, as shown in JP 2020-082753 A (in particular, see FIG. 1) and JP 2020-029190 A (in particular, see FIG. 2). A rear opening (referred to as a "rear window" in JP 2020-029190 A—in particular, see FIG. 2) is formed at the rear of the stack case. The front portion of the case housing the VCU faces the rear opening.

An electrode of the fuel cell stack is provided with a cell voltage detection terminal (also referred to as a "cell V terminal"). The electrode and the cell voltage detection terminal are electrically connected via a harness. The cell V terminal is exposed to the rear opening. Accordingly, an operator can extend his or her hand through the rear opening and perform maintenance on the terminal or around the terminal. Thus, the rear opening is a window for performing some operation.

SUMMARY OF THE INVENTION

It is a main object of the present invention to provide a fuel cell system capable of protecting a cell voltage detection terminal.

According to an embodiment of the present invention, there is provided a fuel cell system comprising a fuel cell stack and a stack case for housing the fuel cell stack, the fuel cell system being mounted in a vehicle, wherein:

a rear opening is formed in a rear portion of the stack case facing backward in a traveling direction of the vehicle, and a cell voltage detection terminal electrically connected to an electrode of the fuel cell stack is exposed in the rear opening;

the rear opening faces an electrical equipment housing case housing electrical equipment, and a multilayer filter is provided in the rear opening;

the multilayer filter includes an inner mesh member, a filter member, and an outer mesh member;

the inner mesh member, the filter member, and the outer mesh member are arranged in this order in a direction away from the stack case.

In the present invention, the rear opening is covered with a multilayer filter. The filter member constituting the multilayer filter is protected by being sandwiched between the inner mesh member and the outer mesh member. Therefore, according to the present invention, it is possible to appropriately protect the cell voltage detection terminal exposed in the rear opening while preventing the filter member from being broken.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, preferred embodiments of the fuel cell system according to the present invention will be described in detail with reference to the accompanying drawings. In the following description, "left", "right", "front", "rear", "down", and "up" refer to the left, right, front, rear, downward, and upward directions of a user seated in the driver's seat of the vehicle. Further, the vehicle width direction has the same meaning as the left-right direction. The vehicle length direction is synonymous with the front-rear direction or the traveling direction, and the vehicle height direction is synonymous with the up-down direction.

Figure 1:
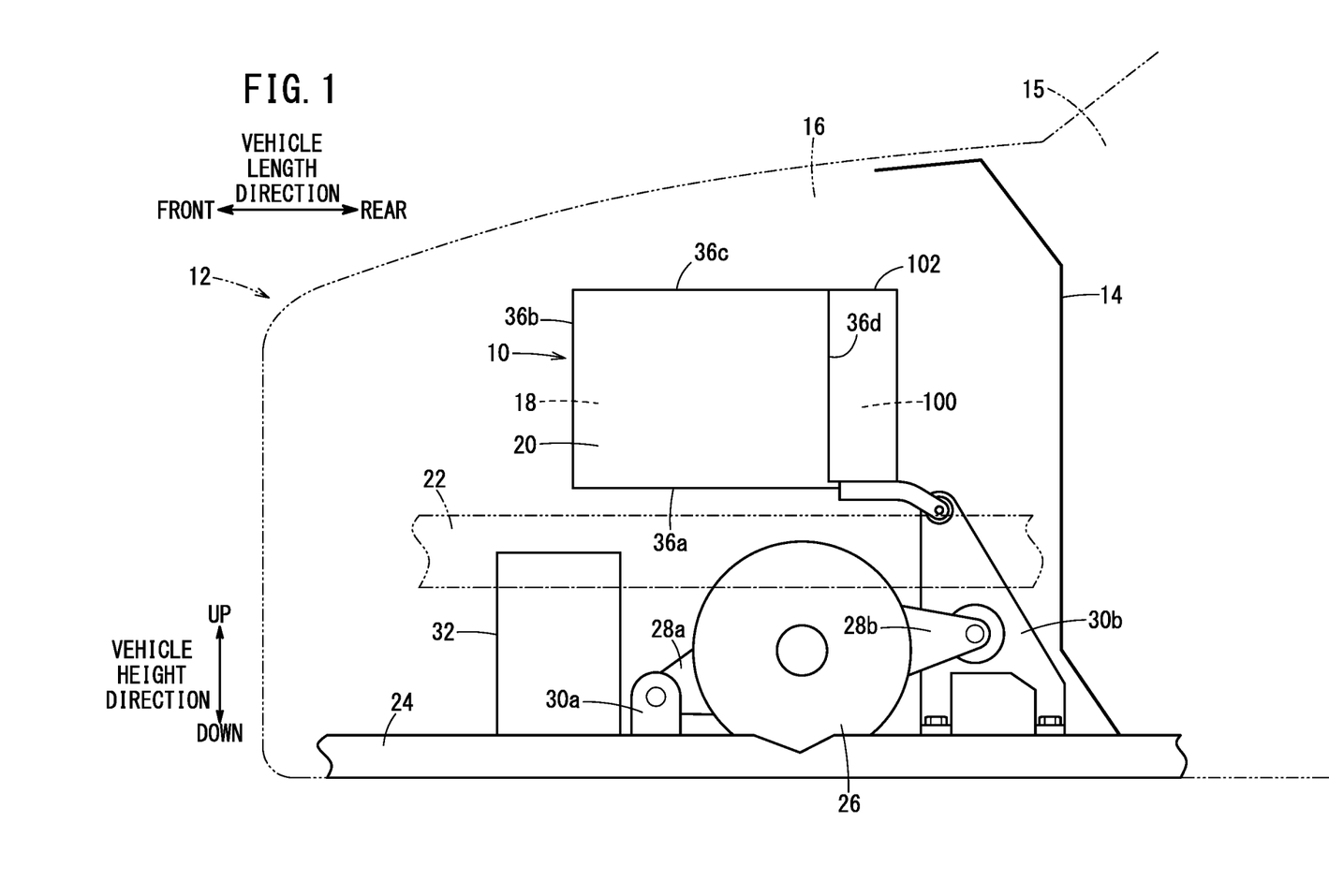
FIG. 1 is a schematic side view of a main part of a vehicle in which a fuel cell system according to an embodiment of the present invention is mounted.

FIG. 1 is the schematic side view of the main part of a fuel cell vehicle 12 (vehicle). A fuel cell system 10 according to the present embodiment is mounted in the fuel cell vehicle 12. In the front of the fuel cell vehicle 12, a front room 16 separated from a passenger compartment 15 by a dashboard 14 is provided. A stack case 20 for accommodating a fuel cell stack 18 is disposed in the front room 16.

The front room 16 is provided with a side frame 22 and a cross member 24. The side frame 22 and the cross member 24 are part of the vehicle body frame. The side frame 22 extends along the longitudinal direction of the vehicle. The cross member 24 extends in the vehicle width direction below the side frame 22.

The fuel cell stack 18 generates electric power based on electrochemical reactions of fuel gas and oxygen-containing gas supplied from a fuel gas supply device and an oxygen-containing gas supply device (both not shown), respectively. The fuel cell stack 18 supplies electric power generated through power generation to a driving motor 26, a battery (not shown), etc. The driving motor 26 is provided in the front room 16, for example.

In this case, the driving motor 26 is disposed below the fuel cell stack 18 and the stack case 20. The driving motor 26 drives the vehicle 12 through a transmission, wheels, and the like (not shown). The front portion of the driving motor 26 is fixed to the cross member 24 via a motor bracket 28*a* and a front support 30*a*. The rear portion of the driving motor 26 is fixed to the cross member 24 via a motor bracket 28*b* and a rear support 30*b*.

A power drive unit (PDU) 32 for supplying appropriate power to the driving motor 26 is provided in front of the driving motor 26. The PDU 32 is configured as a three phase bridge type inverter. The PDU 32 converts the generated power (DC power) of the fuel cell stack 18 into AC power. The PDU 32 adjusts the rotational driving force of the driving motor 26 under the control of an ECU (not shown).

Figure 2:
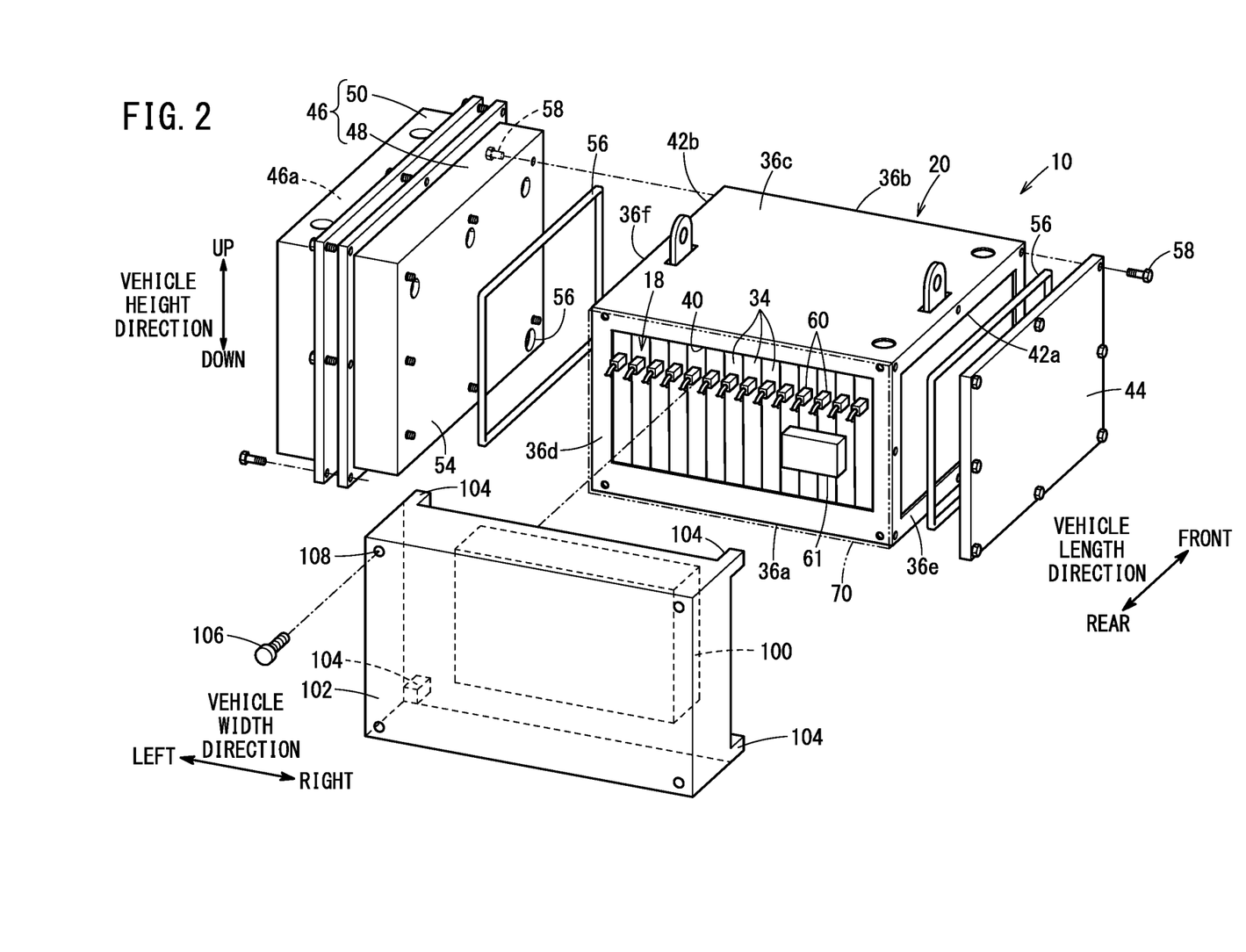
FIG. 2 is a schematic perspective view from behind a stack case constituting the fuel cell system.

As shown in FIG. 2, the fuel cell stack 18 includes a plurality of power generating cells 34 stacked along the vehicle width direction. In this state, the fuel cell stack 18 is housed in the stack case 20. At this time, the electrodes of the power generating cells 34 are in a standing position facing upward.

The stack case 20 has a bottom wall portion 36*a*, a front wall portion 36*b*, and an upper wall portion 36*c*. A rear opening 40 is formed in a rear portion 36*d* of the stack case 20. A right opening 42*a* and a left opening 42*b* are also formed in a right side portion 36*e* and a left side portion 36*f* in the vehicle width direction of the stack case 20, respectively.

A first terminal plate (not shown) and a first insulating plate (not shown) are provided at the right end in the stacking direction (vehicle width direction) of the power generating cells 34. The first terminal plate and the first insulating plate are arranged in this order from the inside toward the outside in the stacking direction. The first terminal plate and the first insulating plate are housed in the stack case 20. A first end plate 44 is attached to the right side portion 36*e* of the stack case 20. The first end plate 44 closes the right opening 42*a* of the stack case 20. The first end plate 44 applies a clamping load directed in the stacking direction to the stack of the power generating cells 34.

Similarly, a second terminal plate (not shown) and a second insulating plate (not shown) are provided at the left end in the stacking direction of the power generating cells 34. The second terminal plate and the second insulating plate are arranged in this order from the inside toward the outside in the stacking direction. The second terminal plate and the second insulating plate are housed in the stack case 20. An auxiliary machine case 46 is attached to the left side portion 36*f* of the stack case 20.

The auxiliary machine case 46 has a first case member 48 having a concave shape and a second case member 50 having a concave shape. The first case member 48 is screwed to the stack case 20. The second case member 50 is joined to the first case member 48. Inside the first case member 48 and the second case member 50, is housed an auxiliary machine such as a hydrogen system auxiliary device (hydrogen gas supply device: devices of the fuel cell system) such as a pipe, an injector, a hydrogen pump, and a valve.

The first case member 48 has a wall portion 54. The wall portion 54 closes the left opening 42*b* at the left end in the stacking direction of the stack case 20. The wall portion 54 functions as a second end plate and applies a fastening load directed in the stacking direction to the stack of the power generating cells 34. A seal member 56 is sandwiched between the first end plate 44 and the stack case 20 and between the wall portion 54 and the stack case 20. In this state, the first end plate 44 and the wall portion 54 are attached to the stack case 20 via a connecting bolt 58.

Each electrode (anode electrode and cathode electrode) of the stacked power generating cells 34 is electrically connected to the first terminal plate and the second terminal plate, respectively. Portions of the first terminal plate and the second terminal plate protrude outward from openings of the upper wall portion 36*c* of the stack case 20. The portions are electrically connected to the VCU 100 through a contactor (not shown). A cell V terminal (cell voltage detection terminal) 60 is electrically connected to each power generating cell 34. Although not particularly shown in the figures, a connection portion is provided at the outer peripheral edge of the separator of each power generating cell 34. The cell V terminal 60 is electrically connected to the connection portion.

Figure 5:
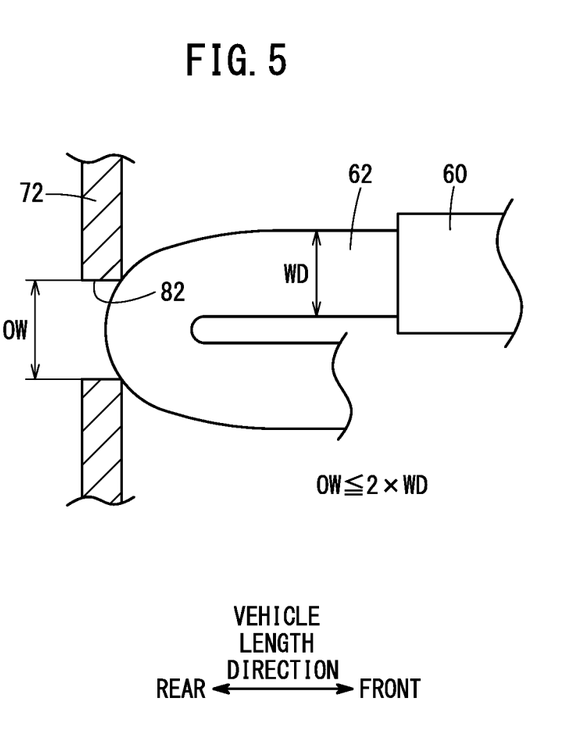
FIG. 5 is an enlarged view of a main part showing the relationship between the width of the harness and the opening width of a hole of an inner mesh member.

The plurality of cell V terminals 60 are detachably provided at a rear portion of the fuel cell stack 18 facing the rear opening 40 and are exposed to the rear opening 40. As shown in FIG. 5, a harness 62 extends from the rear portion of the cell V terminal 60. The harness 62 transmits a detected cell voltage to a cell voltage control unit 61. The cell voltage control unit 61 processes the voltage detected at the cell V terminal 60 and then transmits the processed voltage to the control system of the fuel cell stack 18.

Figure 3:
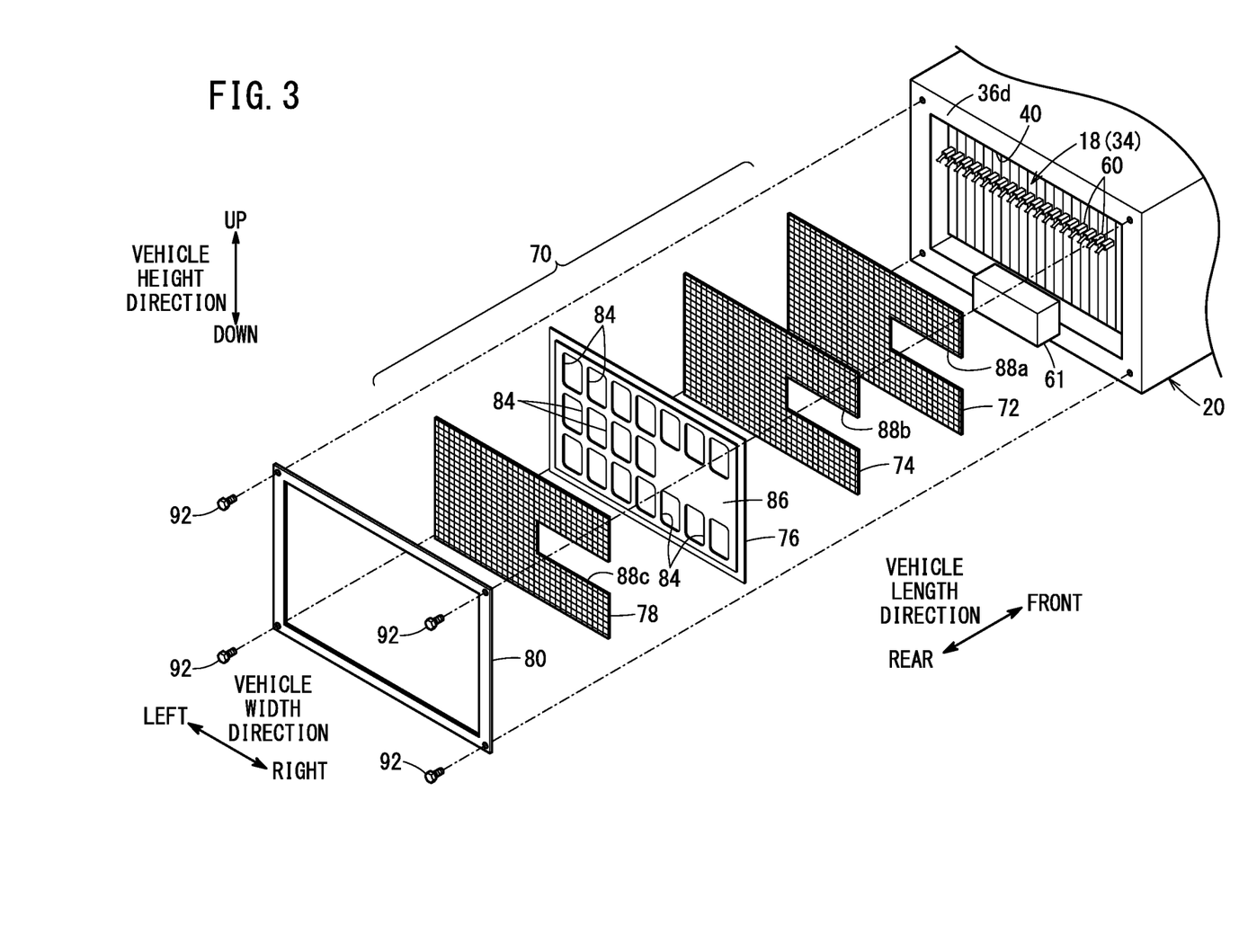
FIG. 3 is an exploded perspective view of a multilayer filter.
Figure 4:
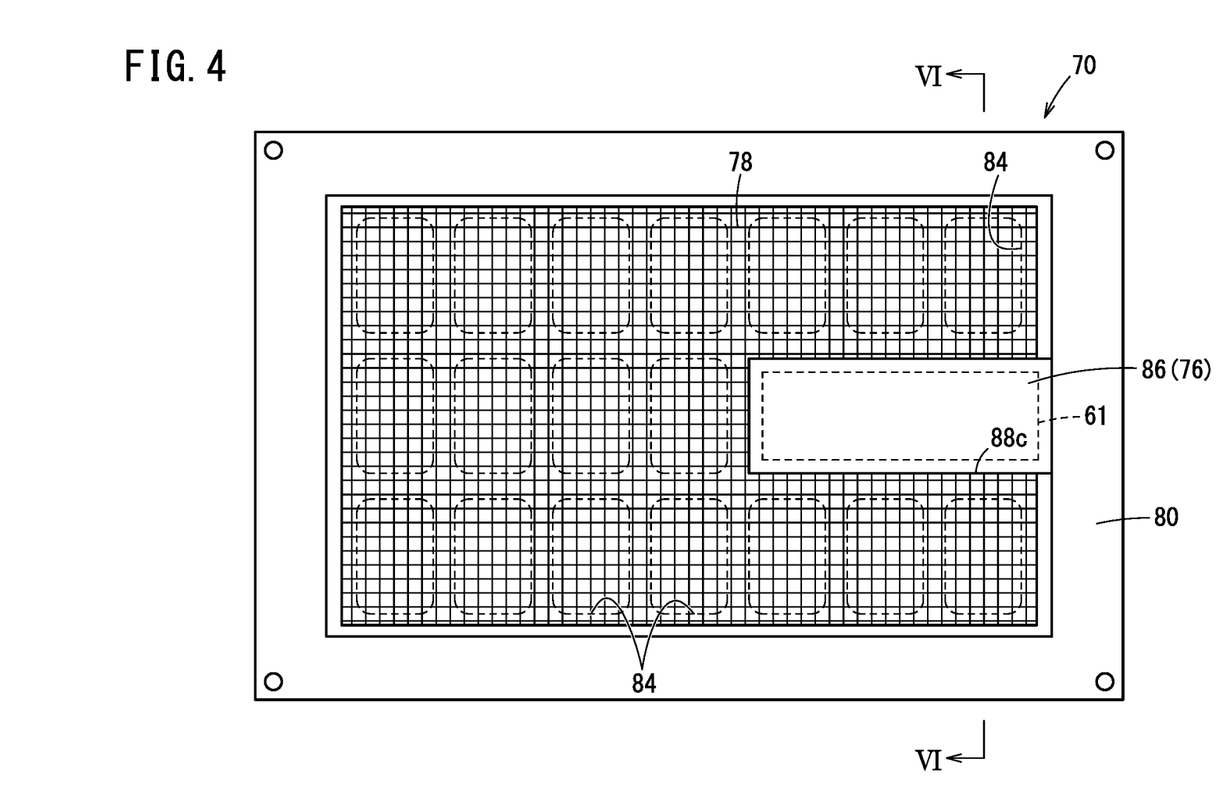
FIG. 4 is a schematic front view of the multilayer filter.

As shown in detail in FIGS. 3 and 4, a multilayer filter 70 is provided in the rear opening 40. In this embodiment, the multilayer filter 70 includes an inner mesh member 72, a filter member 74, a frame-like holding body 76 (holding member), an outer mesh member 78, and a seal plate 80. The inner mesh member 72, the filter member 74 and the frame-like holding member 76 are disposed between the fuel cell stack 18 and the outer mesh member 78. The filter member 74 and the frame-like holding body 76 are disposed between the inner mesh member 72 and the outer mesh member 78. The frame-like holding body 76 is disposed between the filter member 74 and the outer mesh member 78. That is, the inner mesh member 72, the filter member 74, the frame-like holding body 76 (holding member), the outer mesh member 78, and the seal plate 80 are arranged in this order as they move away from the direction in which they are close to the stack case 20.

The inner mesh member 72 and the outer mesh member 78 are formed of a net-like plate having relatively large spaces formed in a lattice shape or a circular shape. On the other hand, the filter member 74 is made of a plate in which ventilation holes smaller than those of the inner mesh member 72 and the outer mesh member 78 are formed. Therefore, the foreign matter not collected by the outer mesh member 78 is collected by the filter member 74. The inner mesh member 72 and the outer mesh member 78 protect the filter member 74 sandwiched between the mesh members 72 and 78.

As shown in FIG. 5, it is preferable that the opening width OW of a hole 82 of the inner mesh member 72 is less than twice the maximum width WD of the harness 62. Here, when the cross section in the direction orthogonal to the longitudinal direction of the harness 62 is substantially circular, the diameter of the harness 62 corresponds to the width. By defining the opening width OW in this manner, a bent portion of the harness 62 can be prevented from entering the hole 82 of the inner mesh member 72. The inner mesh member 72 is made of, for example, a fiber reinforced resin material in which glass fibers are impregnated with resin.

The outer mesh member 78 and the seal plate 80 are made of a metal such as aluminum alloy, for example. The frame-like holding body 76 is made of a fiber reinforced resin material in which glass fibers are impregnated with resin, as in the case of the inner mesh member 72, for example.

The frame-like holding body 76 has a plurality of ventilation holes 84 that pass through the frame-like holding body 76, and a closed wall portion 86 that does not pass through the frame-like holding body 76. A plurality of ventilation holes 84 are formed by cutting out part of the frame-like holding body 76 in a lattice shape. Each ventilation hole 84 passes through the frame-like holding body 76. In this case, the ventilation hole 84 has a vertically elongated rectangular shape. In this embodiment, for example, three rows of ventilation holes 84 are arranged in the vertical direction. An area of the closed wall portion 86 is greater than the opening area of at least one ventilation hole 84. In this embodiment, the closed wall portion 86 provided for the frame-like holding body 76 has an area that closes about half of the ventilation holes 84 in the second row. The cell voltage control unit 61 faces the front surface of the closed wall portion 86. In the inner mesh member 72, the filter member 74, and the outer mesh member 78, notches 88a to 88c are respectively formed at portions corresponding to the closed wall portion 86 (portion that the closed wall portion 86 overlaps).

The inner mesh member 72, the filter member 74, and the outer mesh member 78 may be divided into a plurality of pieces corresponding to the lattice positions of the frame-shaped holding member 76.

Figure 6:
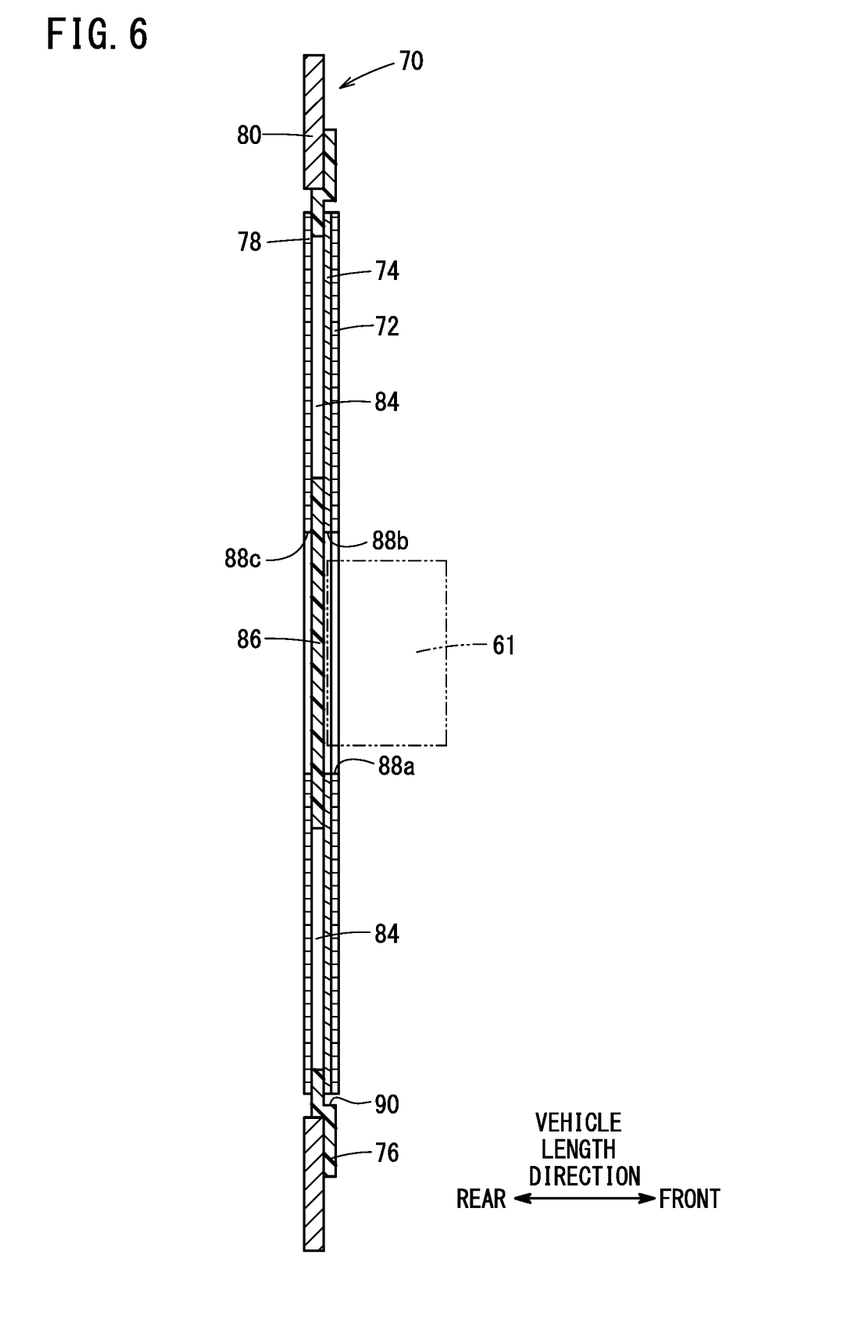
FIG. 6 is a cross-sectional view taken along line VI-VI in FIG. 4.

As shown in FIG. 6, which is a cross-sectional view taken along line VI-VI in FIG. 4, a housing recess 90 is formed in the back surface of the frame-like holding body 76. The filter member 74 is housed in the housing recess 90. The seal plate 80 is connected to the rear portion 36d of the stack case 20 with fixing bolts 92 shown in FIG. 3, whereby the rear opening 40 is covered by the multilayer filter 70.

Figure 7:
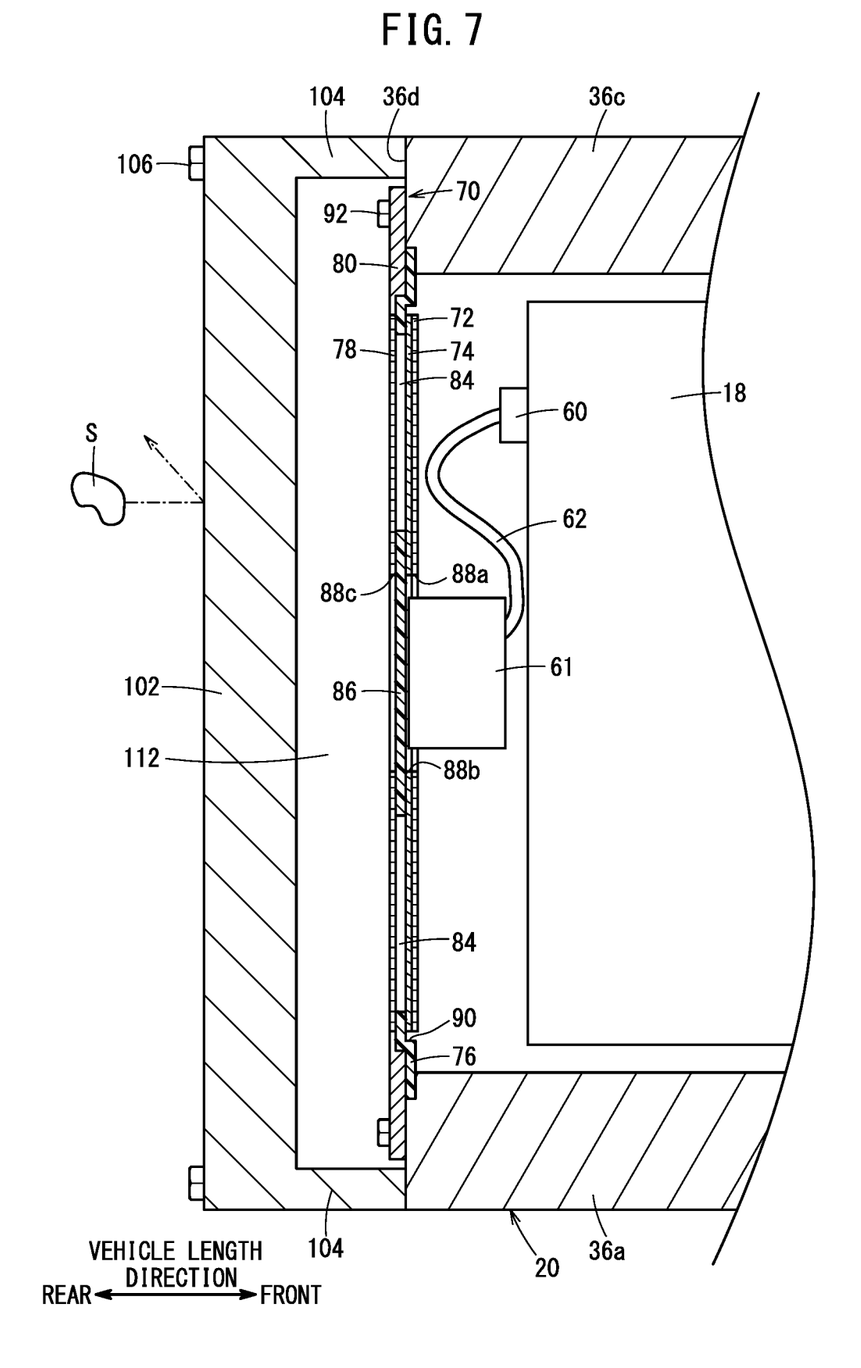
FIG. 7 is a schematic vertical sectional side view showing the vicinity of a connecting portion between the stack case and an electric equipment housing case.

Further, as shown in FIGS. 2 and 7, a VCU case 102 (electronic equipment housing case) for housing the VCU 100 which is electric equipment is connected to the rear portion 36d of the stack case 20. Four mounting portions 104 are provided on a front wall portion of the VCU case 102 facing the stack case 20. The four mounting portions 104 project toward the stack case 20. Through holes 108 are formed from a rear wall portion of the VCU case 102 to front end surfaces of the mounting portions 104. Mounting bolts 106 are passed through the through holes 108. The mounting bolts 106 passed through the through holes 108 are screwed into bolt holes (not shown) formed in the rear portion 36d of the stack case 20. In this way, the multilayer filter 70 is held by the stack case 20. The VCU case 102 is connected to the stack case 20.

At this time, the rear portion 36d (or the multilayer filter 70) of the stack case 20 and the front wall portion of the VCU case 102 are apart from each other by the projecting length of the mounting portions 104. As a result, a gap is formed. Therefore, as shown in FIG. 7, a ventilation opening 112 is formed between the adjacent mounting portions 104.

The fuel cell system according to the present embodiment is basically configured as described above. Next, the operation and effect of the fuel cell system will be described.

In order to attach the multilayer filter 70 to the rear portion 36d of the stack case 20, the following steps are performed.

The inner mesh member 72, the frame-like holding body 76 holding the filter member 74, the outer mesh member 78, and the seal plate 80 are stacked. The inner mesh member 72 faces toward the stack case 20, and the seal plate 80 is connected to the rear portion 36d through the fixing bolts 92. At this time, even if the harness 62 extending from the cell V terminal 60 is in a state of being bent, the bent portion of the harness 62 does not pass through the holes 82 of the inner mesh member 72. This is because the opening width OW of the holes 82 of the inner mesh member 72 is less than twice the maximum width WD of the harness 62. Therefore, the harness 62 is prevented from coming into contact with the filter member 74 and entering (falling into) the inside of the opening. In addition, this prevents the filter member 74 from being damaged.

The frame-like holding body 76 is formed with the closed wall portion 86. This makes it possible to improve the strength of the frame-like holding body 76. Accordingly, the cell voltage control unit 61 adjacent to the frame-shaped holding body 76 on the inner side can be well protected.

Further, the VCU case 102 is attached to the rear portion 36d of the stack case 20. That is, the mounting bolt 106 is passed through the through hole 108 and screwed into a bolt hole (not shown).

During operation of the fuel cell vehicle 12 shown in FIG. 1, fuel gas, oxygen-containing gas, and coolant are supplied to the fuel cell stack 18. The fuel gas is supplied to the anode electrodes of the plurality of power generating cells 34, and the oxygen-containing gas is supplied to the cathode electrodes of the plurality of power generating cells 34. As a result, power generation is performed in the power generating cell 34 and the driving motor 26 is driven. As a result, the fuel cell vehicle 12 starts traveling. A cooling medium is also supplied to the power generating cell 34.

While the fuel cell vehicle 12 is traveling, there may be a case where foreign matter S such as small stones, for example, is thrown up by the tires and flies to the front room 16. When such a situation occurs, the foreign matter S will hit the VCU case 102. As can be understood from this case, the multilayer filter 70 is protected from the large foreign matter S entering the front room 16 by the VCU case 102 covering the multilayer filter 70.

When the foreign matter S enters between the stack case 20 and the VCU case 102 through the ventilation opening 112, the filter member 74 is protected by the outer mesh member 78. Therefore, it is possible to avoid the possibility that fine foreign matter cannot be captured due to breakage or the like of the filter member 74. Further, the cell voltage control unit 61 in the stack case 20 is protected from foreign matter S also by the closed wall portion 86 covering the cell voltage control unit 61.

Part of the running wind reaches the lower portion of the rear portion 36d of the stack case 20. Then, it passes through the holes of the outer mesh member 78, the ventilation holes 84 of the frame-like holding body 76, the holes of the filter member 74, and the holes 82 of the inner mesh member 72, and enters the inside of the stack case 20 through the rear opening 40. When fine foreign matter such as sand grains or dust is contained in the running wind, the foreign matter is caught by the outer mesh member 78 and the filter member 74. Therefore, it is difficult for the foreign matter to enter the stack case 20.

As the power generating cells 34 generate power, the temperature of the fuel cell stack 18 in the stack case 20 rises. Therefore, heat is applied from the fuel cell stack 18 to the running wind entering the inside of the stack case 20.

As a result, the running wind warms up and moves up in the stack case 20. On the other hand, the fuel cell stack 18 is cooled by the running wind.

The specific gravity of hydrogen in fuel gas is smaller than that of air. Therefore, when fuel gas leaks from the fuel cell stack 18 into the stack case 20, hydrogen also moves up in the stack case 20 and joins the running wind. The running wind (and hydrogen) is discharged from an upper portion of the rear opening 40 to the outside of the stack case 20 through the holes 82 of the inner mesh member 72, the holes of the filter member 74, the ventilation holes 84 of the frame-like holding body 76, and the holes of the outer mesh member 78. The running wind (and hydrogen) further reaches the front room 16 through the ventilation opening 112. The running wind (and hydrogen) is then released into the atmosphere from the front room 16.

When maintenance is required for the fuel cell stack 18 (particularly, for example, the cell V terminals 60), an operator loosens the mounting bolts 106 to remove the VCU case 102 from the stack case 20. The operator further loosens the fixing bolts 92 so as to separate the multilayer filter 70 from the stack case 20. After the separation, the rear opening 40 appears. Accordingly, maintenance can be easily performed on the cell V terminals 60 exposed in the rear opening 40.

The present invention is not limited to the above-described embodiments, and various configurations can be adopted therein without departing from the essence and gist of the present invention.

For example, the ventilation holes 84 of the frame-like holding body 76 may have a shape other than a rectangular shape (circular shape or the like).

In this embodiment, the multilayer filter 70 and the VCU case 102 are respectively attached to the stack case 20 with the fixing bolts 92 and the mounting bolts 106. Alternatively, the bolts for attaching the multilayer filter 70 to the stack case 20 and the bolts for connecting the VCU case 102 to the stack case 20 may be common bolts.

What is claimed is:

1. A fuel cell system comprising a fuel cell stack and a stack case for housing the fuel cell stack, the fuel cell system being mounted in a vehicle, wherein:
   a rear opening is formed in a rear portion of the stack case facing backward in a traveling direction of the vehicle, and a cell voltage detection terminal electrically connected to an electrode of the fuel cell stack is exposed in the rear opening;
   the rear opening faces an electrical equipment housing case housing electrical equipment, and a multilayer filter is provided in the rear opening;
   the multilayer filter includes an inner mesh member, a filter member, and an outer mesh member;
   the inner mesh member, the filter member, and the outer mesh member are arranged in this order in a direction away from the stack case.

2. The fuel cell system according to claim 1, wherein the multilayer filter further includes a holding member arranged between the filter member and the outer mesh member and holding the filter member,
   the holding member has a ventilation hole passing through the holding member, and a closed wall portion not passing through the holding member.

3. The fuel cell system according to claim 2, wherein notches are respectively formed in portions of the inner mesh member, the filter member, and the outer mesh member corresponding to the closed wall portion.

4. The fuel cell system according to claim 1, wherein the electric equipment housing case has a plurality of mount portions connected to the stack case, and a ventilation opening is formed between adjacent mount sections of the plurality of mount sections.

5. The fuel cell system according to claim 1, wherein a harness is connected to the cell voltage detection terminal, and an opening width of the inner mesh member is less than twice a maximum width of the harness.

\* \* \* \* \*